April 13, 1965  W. C. JOHNSON  3,178,159
METHOD OF AND APPARATUS FOR HUMIDIFYING AIR
Filed May 23, 1960
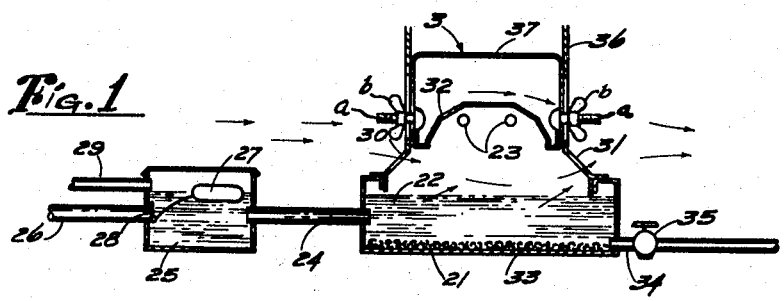
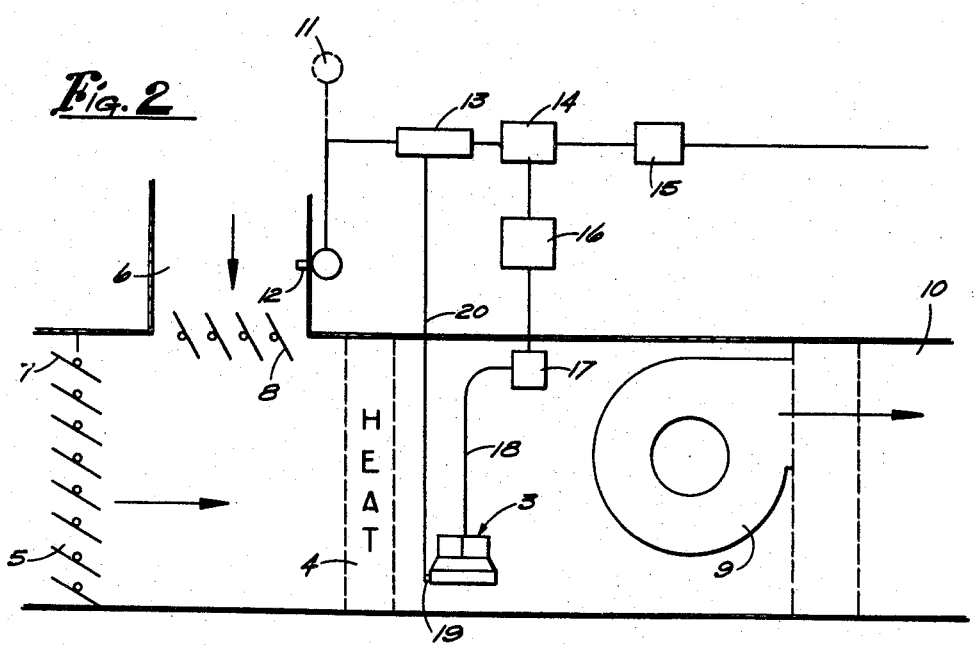
INVENTOR
WARREN C. JOHNSON
ATTY.

United States Patent Office 3,178,159
Patented Apr. 13, 1965

3,178,159
METHOD OF AND APPARATUS FOR
HUMIDIFYING AIR
Warren C. Johnson, Wayne, Ill., assignor to Humidaire
Corporation, Genoa, Ill., a corporation of Illinois
Filed May 23, 1960, Ser. No. 31,074
5 Claims. (Cl. 261—128)

This invention relates to air humidifying and is more particularly concerned with the utilization of radiant energy which enables evaporating water in a pure state, leaving the impurities behind in a precipitated form, the apparatus of the present invention involving the use of an infra-red element disposed horizontally over water in an evaporator pan to effect evaporation by radiation while solids and impurities are precipitated out and collected in a loose form in the evaporator pan or pans from which they may be drained and flushed out periodically, so that there is no liming up to slow up the evaporation process that would otherwise require hours of costly maintenance to clean out, and there is no carrying over of impurities, as in sprayed or atomized vapor, creating difficult cleaning problems in equipment, duct work, filters, machinery, buildings and contents, and no problem of baffle plates or filters becoming clogged with solids to reduce the rate of evaporation if not stop it completely until the parts are either cleaned or replaced, nor is there any necessity for special water treatment, and there are no objectionable odors or foreign matter in the vapors produced.

The more common methods of air humidification utilized heretofore are:

(1) Evaporation by immersion coils of either steam or electrical units, or by heating containers in a suitable manner, the coil or device which supplies the heat becoming insulated in time by deposits of impurities from the water which are attracted to the hot walls and form a very hard covering that is difficult and costly to remove, these formations meaning greatly reduced efficiency.

(2) The water spray method, which is first of all costly, because of the necessity of an additional coil or means of re-heating the air, this method being objectionable because impurities tend to clog the nozzles and form coatings in the pans and other parts wherever the heat is applied and attracts the solids, this method having also an additional disadvantage from the standpoint of a carry-over or "dusting" from the impurities which settle out from the water in the air, this consequently requiring a filtering device to catch those impurities, which in turn means the necessity for frequent cleaning of the apparatus and the related system.

(3) Steam grid humidifiers have been used, but they, first of all, require a source of steam which in many cases means prohibitive installation costs, and the steam generator is subject to the objections mentioned above in regard to liming up, so that a special process of water treatment must be employed at additional expense, and in many instances the odor given off by the treated water is objectionable.

(4) Apparatuses using a system of baffles or plates to effect evaporation by osmosis are subject to similar difficulties in the clogging of the baffles or plates with solids, which slows down the evaporation until it is stopped almost completely until the baffles or plates are either cleaned or replaced.

In the humidifier of my invention an infra-red ray heat source provides direct radiation to the surface of the water, avoiding having the solids or impurities in the water come in contact with the source of heat, these solids being precipitated out and dropping in loose form to the bottom of the pan so that they can have absolutely no deterring effect upon the process unless allowed to build up to the surface of the liquid, which, of course, is never permitted, the solids being removed at regular intervals easily due to their looseness in the pan as a precipitate.

This method of evaporation can be controlled by:

(1) The type of infra-red ray source—there being a variety of lamps providing a range of temperatures between 1400° F. and 4000° F.;

(2) The distance from the radiant source to the surface of the liquid can be varied to change the rate of evaporation;

(3) By controlling voltage to the lamps and regulating time intervals, the temperature can be regulated;

(4) Suitable reflectors can be arranged so that a minimum amount of the infra-red rays are permitted to go unused and the maximum amount is directed toward the surface of the liquid, the opening for the vapor to escape being held to a minimum for maximum efficiency.

The invention is illustrated in the accompanying drawing, in which—

FIG. 1 is a diagrammatic sectional view of the infra-red humidifier of my invention, and FIG. 2 is a diagrammatic section through a warm air furnace, showing a typical humidifier installation.

The same reference numerals are applied to corresponding parts in these two views.

Referring to FIG. 2, which illustrates a typical installation of my improved infra-red humidifier at 3 in the plenum chamber behind the heat exchange unit 4, 5 is the fresh air inlet and 6 is the recirculating air inlet with regulating dampers 7 and 8, respectively, and 9 is the blower delivering the humidified warm air to the building through a duct 10. A room element 11 or duct element 12 provides the humidistat sensing means connected with an electronic unit 13 and an on-off relay contractor 14 and fan motor starter 15, as indicated diagrammatically, the contactor 14 being connected with a safety switch 16 and junction box 17 to supply current to the fan motor at the same time that current is supplied to the infra-red humidifier. A high temperature cut-out 19 on the infra-red humidifier is connected, as indicated at 20, with the electronic unit 13 to shut off the infra-red humidifier should there be any shortage of water supplied thereto for humidification, as might happen in an emergency or in the event a manually operable shut-off valve happens to be left closed.

With this system, the humidistat 11 in the room or the humidistat 12 in the return air plenum turns the infra-red humidifier 3 on and off to maintain the relative humidity within about 2.5% of the desired value, relative humidity of from 30% to 35% with an air temperature of around 72° F. being very comfortable in winter, whereas if the relative humidity is in the range of say 12% to 20%, as it is apt to be without air humidification supplied in accordance with my invention, as herein disclosed at 3, the air would doubtlessly have to be heated to a much higher temperature for comparable comfort—say anywhere from 74° F. to 80° F. With an installation like that shown in FIG. 2, using an infra-red humidifier 3, constructed along the lines disclosed in FIG. 1, I have found it possible to maintain the relative humidity in a building at an average value of 33.8% with an air temperature of approximately 72° F. Colds, viruses, and other respiratory diseases increase in number as humidity falls, and along with the better health and comfort obtained with maintenance of proper humidity goes reduced heating costs, and, of special advantage in various manufacturing plants, reduced static electricity and closer control for special manufacturing processes. The invention, however, is not limited to evaporation of water for air humidification, but is applicable generally to the vaporization of liquids and simultaneous precipitation of solids, for example, in what is termed fractional distillation. The present novel method of heating liquids to evaporation by direct radiation to the surface of the liquid so that the solids or impurities in the liquids have no contact with the source of heat will find many other applications wherever it is desired to precipitate solids so that they may be recovered easily.

Referring now to FIG. 1, the infra-red humidifier 3 comprises a pan 21 containing water 22 maintained at a predetermined level below a pair of parallel horizontal quartz infra-red lamps 23 through a connection 24 with a float chamber 25 to which water is delivered through a pipe 26 and maintained at the same level as in the pan 21 by a float 27 operating a valve 28, an overflow opening 29 positively preventing any rise in level in the pan 21 much above the desired level in the event the float 27 fails to operate properly. Openings are provided at 30 and 31 for air flow between the surface of the liquid 22 and the lamps 23 under the edges of a reflector 32, some of the air flowing from left to right, as indicated by the arrows, passing over the top of the reflector to cool it at the same time that the rest of the air is picking up the moisture created in the evaporation of the liquid at the surface. Any solids separated out in the evaporation of the liquid drop to the bottom, as indicated at 33, and, being loose like any precipitate, these solids can be drained off and flushed out through a pipe 34 from time to time by opening a valve 35. This is a small detail, which, in an actual installation, like that shown in FIG. 2, I have found required about one hour for a man about every two weeks, the maintenance work involving flushing out the sludge 33, wiping off the lamps 23 and the reflector or reflectors 32 and the dampers 7 and 8 with a damp cloth. The precipitated solids, I have found, amounted to about one gallon of dry materials for approximately 1600 gallons of water where the water analysis was as follows: calcium 7.8 grains, magnesium 8.0 grains, or a total hardness of 15.8 grains per gallon, in addition to a substantial amount of alkalinity-bicarbonate 14.4, carbonate 1.0 plus a small amount of iron, silica, sulfates and chloride. Wiping the reflectors and dampers is important, because as a very small percentage of the solids reach the surface of the water and before they can precipitate out there is a drying and popping of this material, which carries it into the air, and the presence of this material on the reflectors tends to reduce efficiency, and cleaning of the dampers reduces carry-over into the duct work. The brackets 36 at opposite ends of the pan 21 have the frame 37, in which the lamps 23 and reflector 32 are mounted, adjustable thereon up and down, as by means of screws $a$ entered in holes in the opposite side walls of the reflector 32 and slidable in vertical slots provided in the brackets 36 and having wing nuts $b$ threaded on the outer ends of the screws to clamp the reflector in a selected position of vertical adjustment, permitting changing the distance from the radiant source to the surface of the liquid, and accordingly changing the rate of evaporation, although I have found that for vaporization of water where the high temperature infra-red ray source—a quartz lamp with a filament temperature of approximately 4000° F., the infra-red source operated most efficiently at approximately 2½ inches above the surface of the water, bearing in mind that this allows proper air movement for the vapor to escape and at the same time keeps the lamp and reflector away far enough to eliminate carry-over of solids. A vaporization rate of approximately 2.71 pounds of water per kilowatt was obtained, which for infra red ray energy means an efficiency of approximately 86.9%. The reflector 32, which I have found gives the best reflection efficiency, is a high temperature, gold-plated reflector. This method of heating to effect evaporation transmits the energy directly to the liquid without wasting of energy to intermediate objects which are necessarily employed in other apparatuses that involve convection or conduction methods, the present method being substantially instantaneous in that the liquid surface attains a high temperature quickly. This surface temperature can be controlled to suit the particular liquid to be evaporated, by (1) Selecting the right kind of lamps having a range of temperatures between 1400° F. and 4000° F.;

(2) Changing the setting of the lamp or lamps closer to or farther away from the surface of the liquid, depending upon the rate of evaporation desired;

(3) Regulating the voltage to the lamp or lamps and varying the time intervals to regulate temperature, and (4) Adjusting the reflector or reflectors to vary their efficiency.

In closing, by way of more specifically describing what is diagrammatically illustrated, but without thereby implying any limitation, the infra-red lamps 23 are T–3 Sylvania quartz lamps, and a two-story building of 32,400 square feet of floor area having an installation of the kind shown in FIG. 2, consisting of two pans of water 20 inches wide, 46 inches long, and 2 inches deep with six of these quartz lamps mounted horizontally about 4 inches above each pan to allow for air flow produced evaporation of approximately 11.5 gallons of water per hour into a 3600 c.f.m. heating unit, thereby maintaining an average humidity of 33.8% at 71.8° F.

These values can be used to calculate capacity needed in gallons per hour through the use of the formula:

$$C = \frac{A \times CFM \times (M_2 - M_1)}{139}$$

where:

$C$ = Capacity needed in gallons per hour.
$A$ = Percent makeup air at maximum humidifying load
$CFM$ = Air flow in cubic feet per minute
$M_1$ = Moisture content of makeup air
$M_2$ = Moisture content desired of air after humidification The T–3 quartz lamps referred to are available in several lengths and wattages, the lamp consisting of a coiled tungsten filament sealed in a quartz tube of ⅜″ diameter, quartz being used instead of ordinary glass because in certain applications the bulb wall temperature may reach as high as 3000° F. for short periods of time. Metal end caps are securely crimped to the end seals and lead wires thereby providing protection for the ends. The 3800-watt T–3 translucent quartz lamps mentioned above as used in a specific installation operate at 550 to 600 volts.

It is believed the foregoing description conveys a good understanding of the objects and advantages of my invention. The appended claims have been drawn to cover all legitimate modifications and adaptations.

I claim:

1. A humidifier for the evaporation of water on a large enough scale for air humidification in buildings, comprising in combination, a substantially horizontal elongated open top pan containing a body of water, an elongated substantially horizontal infra-red heating element supported in closely spaced parallel relationship to the surface of water in the pan longitudinally thereof, a substantially horizontal elongated reflector positioned above said infra-red heating element, whereby the direct action of the infra-red heat rays on the surface of the water evaporates the water while any solids or impurities therein are shielded from the rays by the water and are separated out as a precipitate and are caused to drop by gravity in a loose form to the bottom of the pan, means whereby air to be humidified is circulated substantially horizontally over said reflector and under said reflector between the infra-red heating element and the surface of the water, float regulated water supply means connected with a source of water supply and with said pan for continuously adding water to the body of water in the pan to maintain a predetermined level of water in said pan in a predetermined spaced relationship to the infra-red heating element, and means connected with the bottom portion of the pan and operable at intervals for draining off precipitate collected in the bottom portion of the pan.

2. A humidifier as set forth in claim 1, wherein said float regulated water supply means is approximately on the same level with said pan and has an overflow means slightly above the predetermined level whereby in event of failure of the float to maintain a water level in said pan closely approximating the proper predetermined level until the float is restored to normal operation.

3. A humidifier as set forth in claim 1 including means whereby the distance from the infra-red heating element to the surface of the water in the pan can be varied to change the rate of evaporation.

4. The method of water evaporation on a large enough scale suitable for air humidification in buildings, utilizing a substantially horizontal open top pan of appreciable depth with a substantially horizontal infra-red heating element supported in closely spaced parallel relationship to the surface of a body of water in the pan, whereby the direct action of the infra-red heating rays on the surface of the water evaporates the water while any solids or impurities therein are shielded by the water from the rays and separated out as a precipitate that drops by gravity in a loose form to the bottom of the pan, the method comprising continuously adding water to the pan, maintaining a predetermined level in a predetermined spaced relationship to the infra-red heating element, continuously circulating air horizontally between the surface of the water and the infra-red heating element to be thereby humidified, and at intervals draining off the loose precipitate collected on the bottom of the pan.

5. The method of water evaporation on a large enough scale suitable for air humidification in buildings, utilizing a substantially horizontal open top pan of appreciable depth with a substantially horizontal infra-red heating element supported under a substantially horizontal reflector in closely spaced parallel relationship to the surface of a body of water in the pan, whereby the direct action of the infra-red heating rays on the surface of the water evaporates the water while any solids or impurities therein are shielded by the water from the rays and separated out as a precipitate that drops by gravity in a loose form to the bottom of the pan, the method comprising continuously adding water to the pan, maintaining a predetermined level in a predetermined spaced relationship to the infra-red heating element, continuously circulating air horizontally over the reflector and under the reflector between the surface of the water and the infra-red heating element to be thereby humidified, and at intervals draining off the loose precipitate collected on the bottom of the pan.

References Cited by the Examiner

UNITED STATES PATENTS

| | | |
|---|---|---|
| 1,589,710 | 6/26 | McCafferty. |
| 2,015,279 | 9/35 | Middleton _____ 219—19.6 |
| 2,154,021 | 4/39 | Abbate. |
| 2,357,286 | 9/44 | Reavell _____ 219—38.6 XR |
| 2,759,713 | 8/56 | Maniscalco _____ 21—119 XR |
| 2,860,228 | 11/58 | Boyle et al. _____ 261—39 XR |

FOREIGN PATENTS 941,185    6/48   France.

HARRY B. THORNTON, *Primary Examiner.*

HERBERT L. MARTIN, *Examiner.*